(12) United States Patent
Song et al.

(10) Patent No.: US 7,016,106 B2
(45) Date of Patent: Mar. 21, 2006

(54) GAIN-CONTROLLABLE WIDEBAND OPTICAL FIBER AMPLIFIER

(75) Inventors: Kwan-Woong Song, Songnam-shi (KR); Seong-Taek Hwang, Pyongtaek-shi (KR); Jun-Ho Koh, Suwon-shi (KR)

(73) Assignee: Samsung Electronics Co, Ltd., Suwon-si (KR)

( * ) Notice: Subject to any disclaimer, the term of this patent is extended or adjusted under 35 U.S.C. 154(b) by 175 days.

(21) Appl. No.: 10/688,593

(22) Filed: Oct. 17, 2003

(65) Prior Publication Data
US 2004/0233518 A1 Nov. 25, 2004

(30) Foreign Application Priority Data
May 20, 2003 (KR) .................. 10-2003-0032061

(51) Int. Cl.
*H04B 10/12* (2006.01)

(52) U.S. Cl. ................................. 359/341.1

(58) Field of Classification Search ............... 359/333, 359/349, 341.1
See application file for complete search history.

(56) References Cited

U.S. PATENT DOCUMENTS
6,233,092 B1 * 5/2001 Flood et al. ............... 359/345
6,731,426 B1 * 5/2004 Yeniay et al. ........... 359/341.32

FOREIGN PATENT DOCUMENTS
JP  2002261363 A  *  9/2002
JP  2002319726 A  *  10/2002

\* cited by examiner

*Primary Examiner*—Mark Hellner
(74) *Attorney, Agent, or Firm*—Cha & Reiter LLC

(57) ABSTRACT

Disclosed is a gain-controllable wideband optical fiber amplifier for amplifying both C-band and L-band optical signals, which comprises: a first amplifying section configured to (1) be pumped in at least one direction, (2) amplify both C-band and L-band optical signals and (3) output an amplified spontaneous emission; an optical attenuator for attenuating the power of the spontaneous emission; and a second amplifying section pumped by the attenuated spontaneous emission to secondarily amplify the amplified L-band optical signals.

10 Claims, 2 Drawing Sheets

GAIN-CONTROLLABLE WIDEBAND OPTICAL FIBER AMPLIFIER

CLAIM OF PRIORITY

This application claims priority to an application entitled "Gain-Controllable Wideband Optical Fiber Amplifier," filed in the Korean Intellectual Property Office on May 20, 2003 and assigned Serial No. 2003-32061, the contents of which are hereby incorporated by reference.

BACKGROUND OF THE INVENTION

1. Field of the Invention

The present invention relates to an optical transmission system, and more particularly to a wideband optical fiber amplifier which amplifies both C-band and L-band optical signals for an optical transmission system.

2. Description of the Related Art

With the amount of data growing at an explosive rate recently, there is a large demand to broaden the transmission bandwidth of Wavelength Division Multiplexing (WDM) optical transmission systems. Accordingly, research is now active in a wideband transmission system using both C-band having a wavelength in the range of 1530 nm to 1560 nm and L-band having a wavelength in the range of 1568 nm to 1610 nm. In optical transmission systems, an erbium-doped fiber amplifier (EDFA) (a fiber amplifier doped with the rare-earth element erbium) is generally used as an optical fiber amplifier for amplifying optical signals. This amplifier works only over a bandwidth of about 30 nm in the C-band and the L-band. Although a Raman fiber amplifier (RFA) has a sufficiently broad bandwidth to amplify both C-band and L-band optical signals, it requires a high pump power to obtain a desired gain. Therefore, an EDFA is more generally used as a wideband optical fiber amplifier. However, most EDFAs have a parallel structure for separately amplifying C-band optical signals and L-band optical signals.

FIG. 1 shows a conventional wideband optical fiber amplifier. Optical fiber amplifier 100 is connected to an external optical fiber 110 and comprises first and second amplifying sections 160 and 170. The optical fiber amplifier 100 also includes first and second wavelength selective couplers (WSCs) 121 and 122 for connecting first and second amplifying sections 160 and 170 in a parallel structure.

First wavelength selective coupler 121 divides optical signals having wavelengths of 1550 to 1590 nm, which are inputted through external optical fiber 110, into 1550 nm wavelength band (C-band) signals and 1590 nm wavelength band (L-band) signals, and outputs C-band optical signals to first amplifying section 160 and L-band optical signals to second amplifying section 170.

First amplifying section 160 includes first and second optical isolators (ISOs) 131 and 132, first and second pump laser diodes (LDs) 141 and 142, third and fourth wavelength selective couplers 123 and 124, and a first erbium-doped optical fiber 151. First and second optical isolators 131 and 132 block a light emitted in the backward direction, such as a noise of amplified spontaneous emission (ASE) from first erbium-doped optical fiber 151 and a reflected light. First pump laser diode 141 outputs a first pump light having a 980 nm wavelength. Third wavelength selective coupler 123 outputs the first pump light and the C-band optical signals to first erbium-doped optical fiber 151. Second pump laser diode 142 outputs a second pump light having a 1480 nm wavelength. Fourth wavelength selective coupler 124 outputs the second pump light to first erbium-doped optical fiber 151 and passes the amplified C-band optical signals. First erbium-doped optical fiber 151 is pumped in both directions by the first and second pump lights, thereby amplifying and outputting the inputted C-band optical signals.

Second amplifying section 170 includes third and fourth optical isolators 133 and 134, third and fourth pump laser diodes 143 and 144, fifth and sixth wavelength selective couplers 125 and 126, and a second erbium-doped optical fiber 152. Third and fourth optical isolators 133 and 134 block light emitted in the backward direction, such as an ASE noise outputted from second erbium-doped optical fiber 152 and a reflected light. Third pump laser diode 143 outputs a third pump light having a 980 nm wavelength. Fifth wavelength selective coupler 125 outputs the third pump light and the L-band optical signals to second erbium-doped optical fiber 152. Fourth pump laser diode 144 outputs a fourth pump light having a 1480 nm wavelength. Sixth wavelength selective coupler 126 outputs the fourth pump light to second erbium-doped optical fiber 152 and passes the amplified L-band optical signals. Second erbium-doped optical fiber 152 is pumped in both directions by the third and fourth pump lights, thereby amplifying and outputting the inputted L-band optical signals.

Second wavelength selective coupler 122 couples the C-band optical signals and L-band optical signals received from first and second amplifying sections 160 and 170, respectively, and outputs the coupled signals through external optical fiber 110.

In conventional wideband optical fiber amplifiers as explained above, the second amplifying section for amplifying L-band optical signals has a low amplification efficiency and thus requires the second erbium-doped optical fiber to be long. Also, the second amplifying section requires a higher pump power and has a high noise factor in the L-band. In addition, conventional wideband optical fiber amplifiers require a complicated electric control circuit to control amplification gain, because it uses a large number of pump laser diodes.

SUMMARY OF THE INVENTION

Accordingly, the present invention has been made to reduce or overcome the above-mentioned problems occurring in the prior art. One object of the present invention is to provide a wideband optical fiber amplifier that has a high amplification efficiency and a low noise factor, and which can easily control an amplification gain.

In accordance with the principles of the present invention, a gain-controllable wideband optical fiber amplifier is provided a first and second wavelength band optical signals, comprising: a first amplifying section configured to (1) be pumped in at least one direction, (2) amplify both the first and second wavelength band optical signals and (3) output an amplified spontaneous emission; an optical attenuator for attenuating the power of the amplified spontaneous emission; and a second amplifying section configured to be pumped by the attenuated spontaneous emission to secondarily amplify the amplified second wavelength band optical signals.

BRIEF DESCRIPTION OF THE DRAWINGS

The present invention will be more apparent from the following detailed description taken in conjunction with the accompanying drawings, in which.

DETAILED DESCRIPTION OF THE PREFERRED EMBODIMENT

Figure 1:
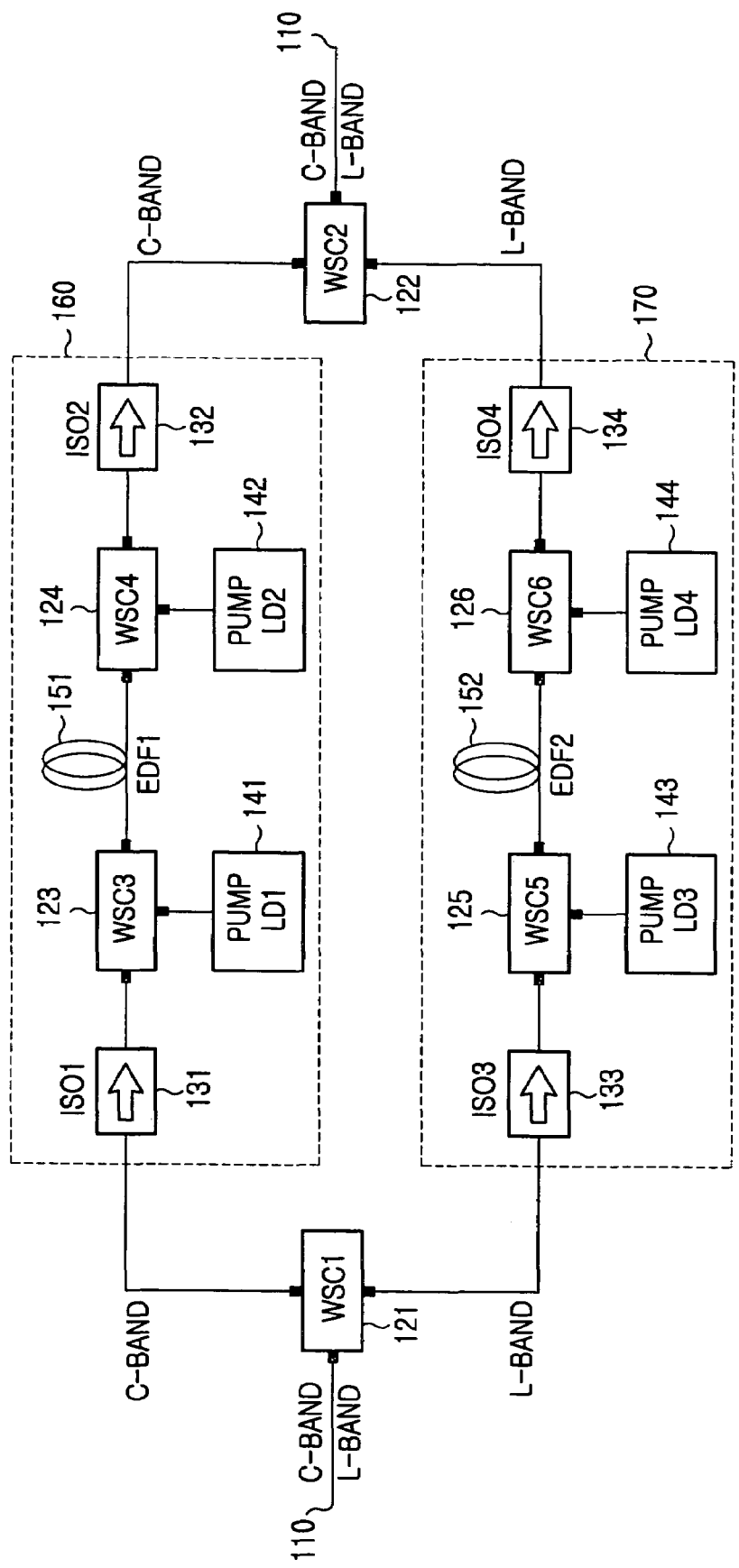
FIG. 1 shows a conventional wideband optical fiber amplifier.

Hereinafter, a preferred embodiment of the present invention will be described with reference to the accompanying drawings. For the purposes of clarity and simplicity, a detailed description of known functions and configurations incorporated herein will be omitted as it may make the subject matter of the present invention unclear.

The wideband optical fiber amplifier according to the present invention includes circulators (CIRs) and wavelength selective couplers (WSCs), each comprising a plurality of ports. Supposing that a circulator or a wavelength selective coupler is provided with a particular drawing reference numeral "###", the $n^{th}$ port of the circulator or the wavelength selective coupler will be provided and depicted with drawing reference numeral "###n".

Figure 2:
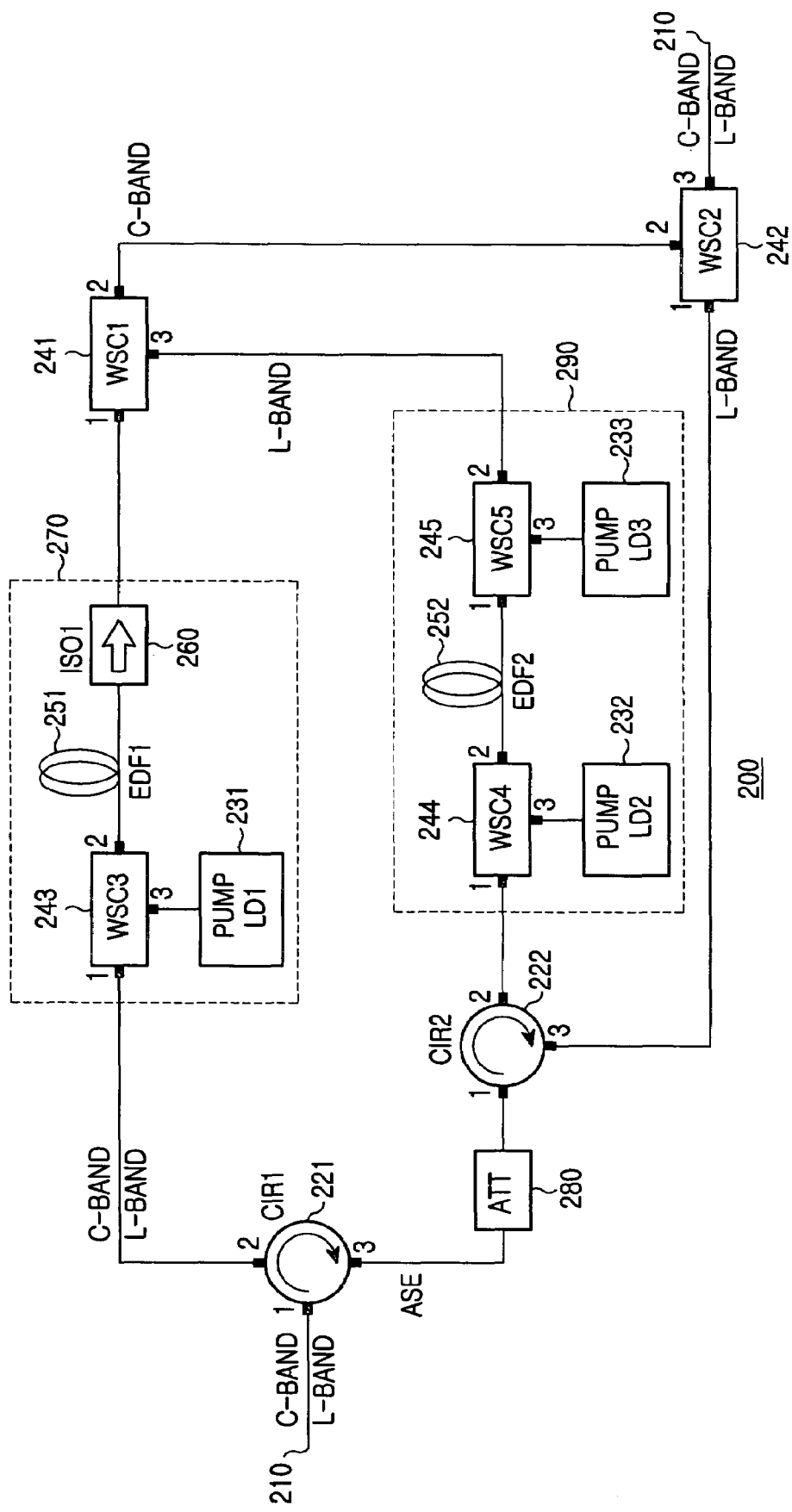
FIG. 2 shows a wideband optical fiber amplifier according to a preferred embodiment of the present invention.

FIG. 2 shows the configuration of the wideband optical fiber amplifier according to the preferred embodiment of the present invention. The amplifier 200 includes first and second circulators 221 and 222, first and second amplifying sections 270 and 290, an optical attenuator (ATT) 280 and first and second wavelength selective couplers 241 and 242.

First circulator 221 has first to third ports 2211 to 2213. An optical signal inputted to an upper port is outputted to an adjacent lower port. First port 2211 of first circulator 221 is connected to an external optical fiber 210. Second port 2212 is connected to the first amplifying section 270, while third port 2213 is connected to optical attenuator 280. First circulator 221 outputs optical signal having at least two wavelength band optical signals, such as C-band optical signals having a 1550 nm wavelength and L-band optical signals having a 1590 nm wavelength, which have been inputted to first port 2211, to second port 2212. Also, first circulator 221 outputs an amplified spontaneous emission inputted to second port 2212 to third port 2213.

First amplifying section 270 connected to second port 2212 of the first circulator 221 includes a first pump light source 231, a third wavelength selective coupler 243, a first amplifying optical fiber 251 and a first optical isolator 260.

First pump light source 231 outputs a first pump light of 980 nm. Laser diodes can be used for the first pump light source and second and third pump light sources.

Third wavelength selective coupler 243 has first to third ports 2431 to 2433. First port 2431 is connected to the second port 2212 of the first circulator 221. Second port 2432 is connected to the first amplifying optical fiber 251. Third port 2433 is connected to the first pump light source 231. Third wavelength selective coupler 243 couples the inputted C-band and L-band optical signals to the first pump light and outputs the coupled signals to first amplifying optical fiber 251.

First amplifying optical fiber 251 is pumped in the forward direction by the first pump light. Also, first amplifying optical fiber 251 outputs an amplified spontaneous emission going in the opposite direction to the optical signals. The amplified spontaneous emission is inputted to second port 2212 of first circulator 221. First circulator 221 outputs the inputted spontaneous emission to third port 2213. First amplifying optical fiber 251 can be an erbium-doped optical fiber.

First optical isolator 260 is disposed between the first amplifying optical fiber 251 and first wavelength selective coupler 243. First optical isolator 260 passes the inputted C-band and L-band optical signals, while blocking a light traveling in the backward direction.

First wavelength selective coupler 241 has first to third ports 2411 to 2413. First port 2411 is connected to first optical isolator 260. Second port 2412 is connected to second wavelength selective coupler 242. Third port 2413 is connected to second amplifying section 290. First wavelength selective coupler 241 outputs the C-band optical signals, among the inputted C-band and L-band optical signals, to second port 2412, and the L-band optical signals to third port 2413.

Optical attenuator 280 is disposed between third port 2213 of first circulator 221 and first port 2221 of a second circulator 222. Since the transmissivity varies depending on the applied current, optical attenuator 280 transmits the inputted spontaneous emission according to a preset transmissivity.

Second circulator 222 has first to third ports 2221 to 2223. First port 2221 is connected to optical attenuator 280. Second port 2222 is connected to second amplifying section 290. Third port 2223 is connected to first port 2421 of second wavelength selective coupler 242. Second circulator 222 outputs the attenuated spontaneous emission, which has been inputted to first port 2221, to second port 2222. Also, second circulator 222 outputs the secondarily-amplified L-band optical signals, which have been inputted to second port 2222, to third port 2223.

Second amplifying section 290 is disposed between third port 2413 of first wavelength selective coupler 241 and second port 2222 of second circulator 222. Second amplifying section 290 includes second and third pump light sources 232 and 233, fourth and fifth wavelength selective couplers 244 and 245, and a second amplifying optical fiber 252.

Second pump light source 232 outputs a second pump light of 980 nm.

Fourth wavelength selective coupler 244 has first to third ports 2441 to 2443. First port 2441 is connected to second port 2222 of second circulator 222. Second port 2442 is connected to second amplifying optical fiber 252. Third port 2443 is connected to second pump light source 232. Fourth wavelength selective coupler 244 couples the attenuated spontaneous emission to the second pump light and outputs the coupled light to second amplifying optical fiber 252. Also, fourth wavelength selective coupler 244 outputs the secondarily-amplified L-band optical signals, which have been inputted to second port 2442, to first port 2441.

Third pump light source 233 outputs a third pump light of 1480 nm.

Fifth wavelength selective coupler 245 has first to third ports 2451 to 2453. First port 2451 is connected to second amplifying optical fiber 252. Second port 2452 is connected to third port 2413 of first wavelength selective coupler 241. Third port 2453 is connected to third pump light source 233. Fifth wavelength selective coupler 245 couples the amplified L-band optical signals to the third pump light and outputs the coupled signals to second amplifying optical fiber 252.

Second amplifying optical fiber 252 is pumped in the backward direction by the attenuated spontaneous emission and the second pump light, while being pumped in the forward direction by the third pump light. Accordingly, second amplifying optical fiber 252 secondarily amplifies and outputs the amplified L-band optical signals. In other words, the L-band optical signals are amplified twice once by each of the first and second amplifying sections 270 and 290. Second amplifying optical fiber 252 can be an erbium-doped optical fiber.

Second wavelength selective coupler 242 has first to third ports 2421 to 2423. First port 2421 is connected to third port 2223 of second circulator 222. Second port 2422 is connected to second port 2412 of first wavelength selective coupler 241. Third port 2423 is connected to external optical fiber 210. Second wavelength selective coupler 242 couples the secondarily-amplified L-band optical signals, which have been inputted to first port 2421, to the C-band optical signals, which have been inputted to second port 2422, and outputs the coupled signals to third port 2423.

Optical attenuator 280 performs the following two functions.

It is possible to control the gain of first amplifying section 270 by controlling the power of the first pump power supplied to first amplifying optical fiber 251. The power of an amplified spontaneous emission outputted from the first amplifying optical fiber 251 is changed with the power variation of the first pump light. If the amplified spontaneous emission is supplied to second amplifying section 290 without any change, the gain of the second amplifying section 290 will be influenced by a change in gain of the first amplifying section 270. Therefore, the optical attenuator 280 eliminates such an influence. This is the first function of the optical attenuator 280.

While the gain of first amplifying section 270 can be controlled by the control of the power of the first pump light, the gain of second amplifying section 290 can be controlled by the control of transmissivity of optical attenuator 280. Therefore, it is not necessary to control the second and third pump power sources included in second amplifying section 290 by a complicated process of providing an additional control circuit, setting a new algorithm, or the like. It is possible to easily control the gain of second amplifying section 290 by controlling optical attenuator 280 only. This is the second function of optical attenuator 280.

Wideband optical fiber amplifier 200 pumps second amplifying optical fiber 252 which amplifies L-band optical signals with an amplified spontaneous emission in the C-band, thereby having a higher amplification efficiency. In addition, wideband optical fiber amplifier 200 can greatly reduce the noise factor in the L-band, as compared to conventional optical fiber amplifiers, because it amplifies C-band optical signals and L-band optical signals together through first amplifying optical fiber 251.

As described above, the gain-controllable wideband optical fiber amplifier of the present invention can obtain a higher amplification efficiency by pumping an amplifying optical fiber for amplifying only L-band optical signals with an amplified spontaneous emission in the C-band. At the same time, the wideband optical fiber amplifier of the present invention can reduce the noise factor in the L-band by amplifying C-band and L-band optical signals together through an amplifying optical fiber for pre-amplification.

In addition, the gain-controllable wideband optical fiber amplifier according to the present invention can easily control the gain of L-band optical signals by controlling the power of the spontaneous emission inputted to an amplifying optical fiber, which amplifies only L-band optical signals, using an optical attenuator.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A wideband optical fiber amplifier for amplifying a first and second wavelength band optical signals, comprising:
   a first amplifying section configured to (1) be pumped in at least one direction, (2) amplify both the first and second wavelength band optical signals and (3) output backward amplified spontaneous emission;
   an optical attenuator for attenuating the power of the backward amplified spontaneous emission; and
   a second amplifying section configured to be pumped by the attenuated backward spontaneous emission to secondarily amplify the amplified second wavelength band optical signals.

2. The wideband optical fiber amplifier according to claim 1, wherein
   said amplified first wavelength band optical signals and said secondarily amplified second wavelength band optical signals are outputted to an external optical fiber.

3. The wideband optical fiber amplifier according to claim 2, wherein said first and second wavelength band optical signals are C-band and L-band optical signals.

4. The wide-band fiber amplifier according to claim 3, wherein the first amplifying section includes a first amplifying fiber adapted to be pumped in at least one direction.

5. The wide-band fiber amplifier according to claim 4, wherein the second amplifying section includes a second amplifying fiber adapted to be pumped by amplified spontaneous emission.

6. The wideband optical fiber amplifier according to claim 3, wherein said first amplifying section includes:
   a pump light source having a preset wavelength; and
   a wavelength selective coupler the pump light to said first amplifying optical fiber.

7. The wideband optical fiber amplifier according to claim 6, wherein said first amplifying section further includes an optical isolator for passing C-band and L-band optical signals from said first amplifying optical fiber and blocking a light traveling in the backward direction.

8. The wideband optical fiber amplifier according to claim 3, wherein said second amplifying section includes:
   a pump light source to output a pump light having a preset wavelength; and
   a wavelength selective coupler to output the pump light to said second amplifying optical fiber.

9. The wideband optical fiber amplifier according to claim 3, wherein said second amplifying section includes:
   a first pump light source having a first preset wavelength;
   a first wavelength selective coupler to output the first pump light to said second amplifying optical fiber;
   a second pump light source having a second preset wavelength; and
   a second wavelength selective coupler to output the second pump light to said second amplifying optical fiber.

10. The wideband optical fiber amplifier according to claim 3, further comprising:
    a first circulator configured to (1) output received C-band and L-band optical signals to said first amplifying section, and (2) output the received amplified spontaneous emission to said optical attenuator;
    a first wavelength selective coupler to divide received C-band and L-band optical signals from said first amplifying section and output the divided C-band optical signals, and the divided L-band optical signals to said second amplifying section;

a second circulator to output received attenuated spontaneous emission to said second amplifying section and output received secondarily-amplified L-band optical signals; and a second wavelength selective coupler to output amplified C-band optical signals from said first wavelength selective coupler, and secondarily-amplified L-band optical signals from said second circulator.

* * * * *